United States Patent Office — 3,570,105, Patented Mar. 16, 1971

3,570,105
METHOD OF MAKING NON-BUBBLING DISPERSION-STRENGTHENED LEAD PRODUCTS
Michael V. Rose, Sewickley, Pa., assignor to St. Joseph Lead Company, New York, N.Y.
No Drawing. Original application Feb. 10, 1966, Ser. No. 526,394, now Patent No. 3,499,800, dated Mar. 10, 1970. Divided and this application May 28, 1969, Ser. No. 841,665
Int. Cl. B22f $3/24$
U.S. Cl. 29—420.5    5 Claims

ABSTRACT OF THE DISCLOSURE

Method of producing lead products strengthened by the dispersion of insoluble solid substances therein and capable of being hot worked without substantial gas evolution. The products are made by heating lead particles not exceeding about 150 microns in particle size, coated or admixed with solid substances capable of dispersion in the lead, at a temperature in the range from about 280° C. to just below the melting point of the lead particles and thereafter subjecting a body of the particles to plastic deformation to disperse the insoluble solid substance in the lead matrix.

---

This application is a divisional application of my application Ser. No. 526,394, filed Feb. 10, 1966, and now Patent No. 3,499,800.

This invention relates to non-bubbling dispersion strengthened lead and to methods of making it.

It is known that the physical properties of lead may be enhanced markedly by dispersing within the lead insoluble particles of solid substances such as an oxide or oxides of lead or other oxides, such as alumina, magnesia, lime, metals or metallic alloys such as copper, cobalt, nickel and iron-cobalt alloys, and carbon. A practical range for such additions is in the amount of from about 0.5% to 16% by weight. In general the added substances are coated on or admixed with lead particles not more than about 150 microns and preferably not over 20 microns in average particle size. A body of the lead particles containing such admixtures or coatings is then subjected to plastic deformation, for example, by rolling or extrusion to comminute the solid substance and to disperse the comminuted substance in the lead matrix.

Of particular interest are the lead products obtained by dispersing within the lead insoluble particles of an oxide or oxides of lead. This may be accomplished by subjecting finely divided lead to conditions under which a coating of oxide is formed on the surface of the lead particles as by atomizing molten lead in an oxidizing atmosphere, such as air, or by subjecting lead particles to the action of an oxidizing gas under controlled conditions, for example, by stirring the lead particles in air in the presence of controlled amounts of moisture in a pan mixer, a double cone mixer or the like. A body of thus treated lead particles is then subjected to plastic deformation for example, by rolling or extrusion to comminute the lead oxide coating thereon and to disperse the comminuted lead oxide in the lead matrix.

In general, the oxide-coated lead particles should not exceed about 150 microns in size and preferably should not exceed an average particle size of about 20 microns and the surface coating of lead oxide should be in the range of from about 0.5% to about 16% by weight calculated as PbO.

In the known methods of manufacturing dispersion strengthened lead, there inevitably occurs a greater or less take-up of carbon dioxide and water vapor which in turn leads to the presence of various amounts and forms of carbonate and hydrated compounds on the surface of the lead particles. When the resulting specimens of dispersion strengthened lead are heated above some critical temperature, there is observed to occur a bubbling or disturbing action which, it has been discovered, is caused by release of internally generated and entrapped gases. These gases arise from expansion of entrapped air and decomposition of lead compounds other than lead oxide under the influence of heat. Whatever the actual cause for the gas generation may be, the practical fact is that this phenomenon causes difficulty in hot warking, for example rolling, forging and extrusion where heat is generated during processing or where the material is preheated prior to being subjected to the working process, and more importantly, it imposes drastic restrictions on the joinability of dispersion strengthened lead parts by conventional welding techniques. Heating of the areas to be joined induces the bubbling phenomenon and leads to an incomplete closure of the joint. Such an imperfect joint may suffer corrosion in certain uses, for example, where a dispersion strengthened lead sheet is used as a plate in a storage battery with a sulfuric acid anolyte.

I have found that this evolution of gas during hot working of dispersion strengthened lead, as by hot rolling or welding, may be substantially eliminated by heating the lead particles after coating or admixing with dispersion strengthening substance to a temperature of from about 280° C. to just below the melting point of the lead particles. In this heating operation the major portion of the entrapped air is removed and the heated particles are substantially free of hydroxyl (OH), carbonate ($CO_3$) or other groups capable of evolving water or carbon dioxide on heating. The removal of the heat generated gases from the treated lead particles can advantageously be accelerated by carrying out the heating operation under vacuum.

The heat treated particles are then compacted and subjected to plastic deformation, for example, by rolling or extrusion to comminute the coating or admixed substance and disperse it in the lead matrix. The products of the invention may be marketed either in the form of the heat treated particles or in the form of rolled, extruded or otherwise shaped articles. Such articles may be hot-rolled or fusion welded without any indication of bubbling or development of porosity. It is desirable, however, not to exceed a temperature of about 430° C. in fusion welding operation as a further moderate evolution of gas may occur above this temperature.

The following example is illustrative of the principles of the invention:

Lead powder having an average particle size of approximately 10 microns and a surface oxide content in the amount of about 2.8% calculated as PbO is heated to a temperature of 300–310° C. for two hours under a vacuum of $10^{-3}$ mm. of Hg. The resulting particles are compacted into a bar under 60,000 p.s.i. pressure in a similar vacuum and extruded at a 25 to 1 reduction ratio. The extruded structures are readily welded by conventional welding techniques whereas the original particles similarly compacted and extruded without the heating step of the invention form unsatisfactory welded joints because of evolution of gas at the joint.

I claim:

1. A method of making lead products strengthened by the dispersion therein of insoluble solid substances and capable of being hot worked without substantial gas evolution which comprises heating lead particles not exceeding about 150 microns in particle size, coated or admixed with solid substances capable of dispersion in the lead by plastic deformation, at a temperature in the range from about 280° C. to just below the melting point of the lead particles and thereafter subjecting a body of said particles to plastic deformation to disperse said solid substance in the lead matrix.

2. A method as defined in claim 1 wherein the heating is carried out under subatmospheric pressure.

3. A method of making lead products strengthened by the dispersion of lead oxide therein and capable of being hot worked without substantial gas evolution which comprises heating oxide coated lead particles at a temperature in the range from about 280° C. to just below the melting point of the lead particles and thereafter subjecting a body of said particles to plastic deformation to comminute the lead oxide and disperse the comminuted lead oxide in the lead matrix.

4. A method defined in claim 3 wherein the particles do not exceed about 150 microns in particle size and are coated with lead oxide in an amount of from about 0.5% to about 16% by weight calculated as PbO.

5. A method as defined in claim 3 wherein the heating is carried out under subatmospheric pressure.

References Cited

UNITED STATES PATENTS

| | | | |
|---|---|---|---|
| 3,159,908 | 12/1964 | Anders | 29—420X |
| 3,166,416 | 1/1965 | Worn | 148—6.3X |
| 3,189,989 | 6/1965 | Ebdor | 29—420.5 |
| 3,315,342 | 4/1967 | Roberts | 29—420.5 |
| 3,320,664 | 5/1967 | Krantz et al. | 29—420.5 |
| 3,346,677 | 10/1967 | Kinsell | 264—12 |

JOHN F. CAMPBELL, Primary Examiner

D. C. REILEY, Assistant Examiner

U.S. Cl. X.R.

75—206; 148—6.31; 264—12